(12) United States Patent
Mizuuchi et al.

(10) Patent No.: US 7,171,094 B2
(45) Date of Patent: Jan. 30, 2007

(54) OPTICAL WAVEGUIDE DEVICE, OPTICAL WAVEGUIDE LASER USING THE SAME AND OPTICAL APPARATUS EQUIPPED WITH THE SAME

(75) Inventors: Kiminori Mizuuchi, Neyagawa (JP);
Kazuhisa Yamamoto, Takatsuki (JP);
Minoru Imaeda, Nagoya (JP); Tatsuo Kawaguchi, Motosu-gun (JP); Takashi Yoshino, Ama-gun (JP)

(73) Assignees: Matsushita Electric Industrial Co., Ltd., Osaka (JP); NGK Insulators, Ltd., Aichi (JP)

( * ) Notice: Subject to any disclaimer, the term of this patent is extended or adjusted under 35 U.S.C. 154(b) by 0 days.

(21) Appl. No.: 10/542,424

(22) PCT Filed: Dec. 22, 2003

(86) PCT No.: PCT/JP03/16487

§ 371 (c)(1),
(2), (4) Date: Jul. 14, 2005

(87) PCT Pub. No.: WO2004/063808

PCT Pub. Date: Jul. 29, 2004

(65) Prior Publication Data

US 2006/0109542 A1 May 25, 2006

(30) Foreign Application Priority Data

Jan. 15, 2003 (JP) .............................. 2003-007445

(51) Int. Cl.
*G02B 6/10* (2006.01)

(52) U.S. Cl. ..................................................... 385/129
(58) Field of Classification Search .................. 385/129
See application file for complete search history.

(56) References Cited

U.S. PATENT DOCUMENTS

| 5,664,032 A | * | 9/1997 | Bischel et al. ................. 385/4 |
| 2001/0055453 A1 | * | 12/2001 | Mizuuchi et al. ........... 385/122 |

FOREIGN PATENT DOCUMENTS

EP  0 867 985  9/1998

(Continued)

OTHER PUBLICATIONS

Chou, et al., "1.5-μm-band wavelenght conversion based on difference-frequency generation in LiNbO$_3$ waveguides with integrated coupling structures", Optics Letters, 1998, vol. 23, No. 13, pp. 1004-1006.

(Continued)

*Primary Examiner*—Michelle Connelly-Cushwa
*Assistant Examiner*—Chris Chu
(74) *Attorney, Agent, or Firm*—Hamre, Schumann, Mueller & Larson, P.C.

(57) ABSTRACT

An optical waveguide device includes a waveguide layer that converts a wavelength of incident light and emits converted light. In the waveguide layer, a ridge waveguide and slab waveguides are provided, the slab waveguides being formed on both sides of the ridge waveguide with recess portions intervening therebetween. The waveguide layer satisfies a multi-mode condition for the incident light, and light propagating through the ridge waveguide is in a single mode.

15 Claims, 7 Drawing Sheets

FOREIGN PATENT DOCUMENTS

| | | |
|---|---|---|
| JP | 1-183603 | 7/1989 |
| JP | 2000-200940 | 7/2000 |
| JP | 2002-365680 | 12/2002 |

OTHER PUBLICATIONS

Asóbe, et al., Polarization Independent Wavelenght Conversion in a Periodically poled Zn:LiNbO3 Ridge Waveguide, CLEO 2002, May 2002, CThK3.

Kawaguchi, et al., "New ridge-type $LiNbO_3$ optical waveguide for high-power QPM-SHG laster", Technical Report of IEICE, LQE2002-8, May 2002 pp. 29-32.

Nee, et al., "Optical frequency division by 3 of 532 nm in periodically poled lithium niobate with a double grating", Optics Letters, vol. 23, No. 1, Jan. 1, 1998.

* cited by examiner

FIG. 7A
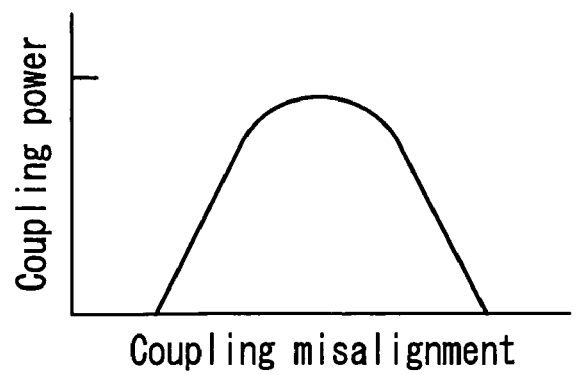
FIG. 7B
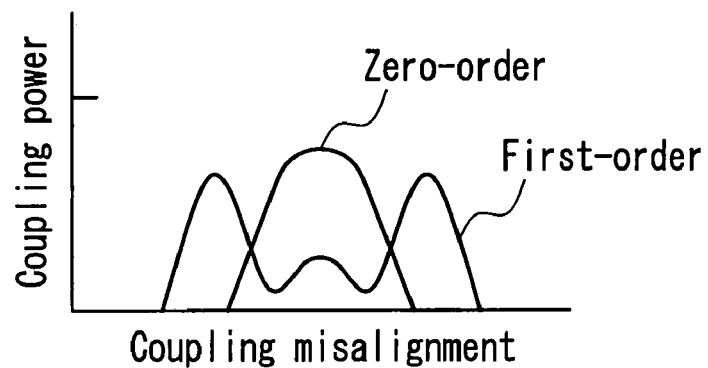
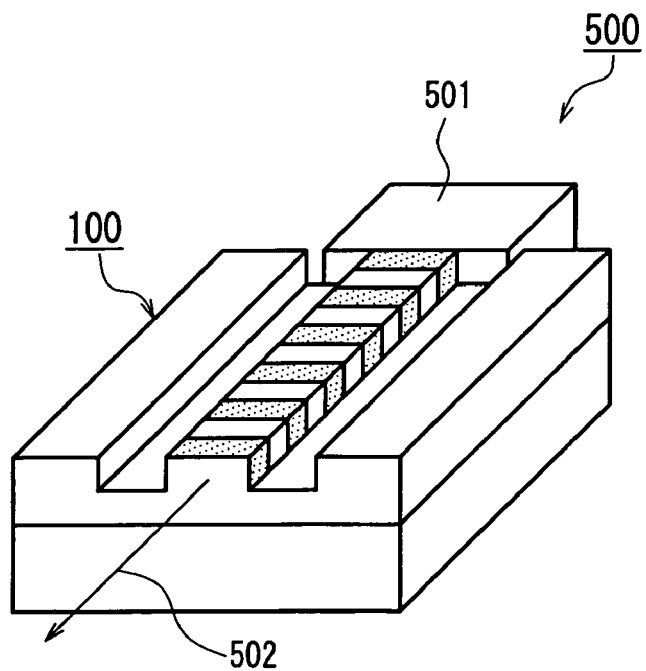
FIG. 8

OPTICAL WAVEGUIDE DEVICE, OPTICAL WAVEGUIDE LASER USING THE SAME AND OPTICAL APPARATUS EQUIPPED WITH THE SAME

TECHNICAL FIELD

The present invention relates to an optical waveguide device used in the optical information processing field and the optical communication field, and also relates to an optical waveguide laser using the same and an optical apparatus equipped with the same.

BACKGROUND ART

In the optical information processing field and the optical communication field, it has been attempted to increase communication capability by optical multiplex communication. Wavelength multiplexing, which permits the transmission of a large number of wavelengths in one fiber, enables a drastic increase in the transmission capacity of the fiber. For the wavelength multiplexing transmission, optical routing plays an important role in demultiplexing and multiplexing light depending on wavelengths. To this end, signal light is controlled by converting light with a specific wavelength into light with a different wavelength. As a method of this optical routing, difference-frequency conversion is used, which utilizes a nonlinear optical effect. Signal light and pump light are introduced into a nonlinear optical element, and difference-frequency light between the signal light and the pump light is rendered new signal light, whereby wavelengths of the signal light can be converted collectively. Since the nonlinear optical effect is utilized, wavelength conversion at a high speed is possible. As such a wavelength conversion element, a waveguide-based difference-frequency generation device that utilizes quasi phase matching has been proposed (see M. H. Chou, et al., OPTICS LETTERS, 1998, vol. 23, No. 13, pp 1004–1006).

FIG. 10 shows the configuration of a conventional optical waveguide-based difference-frequency generation device. On a $LiNbO_3$ substrate, a periodically domain-inverted structure 801 and a proton-exchanged waveguide 802 are formed. At an incident portion of the optical waveguide, a segment tapered waveguide 803 is formed. Light with a wavelength in 1.56 μm-band is used as signal light, light with a wavelength of 0.78 μm is used as pump light and light with a wavelength in 1.56-μm band is used as difference-frequency light. In order to satisfy the condition for allowing the 1.56-μm signal light and difference-frequency light to be guided, the optical waveguide has a multi-mode condition for the pump light with a wavelength of 0.78 μm. In this regard, it is difficult to couple light in a single mode with a proton-exchanged waveguide having a multi-mode condition. For that reason, incident portions are provided separately for the signal light and the pump light, and the segment tapered waveguide 803 is used for the incident portion of the pump light.

The segment tapered waveguide 803 offers a single mode condition to the pump light at the incident portion of the waveguide, and then gradually introduces the guided light into the optical waveguide having a multi-mode condition, so as to let the guided light propagate in a single mode through the multi-mode waveguide. In other words, the segment tapered waveguide allows the conversion in the waveguide from the single-mode propagation light in the single-mode waveguide to the single-mode propagation light in the multi-mode waveguide. The signal light and the pump light are allowed to propagate in the single mode through the optical waveguide having the domain-inverted structure, whereby overlap in the waveguide increases, thus enabling the generation of difference-frequency light with high efficiency.

However, the optical waveguide used in a conventional optical waveguide device is a stripe-shaped three-dimensional waveguide, which does not have a symmetrical configuration in refractive index distribution. Therefore, the following problems occur: it is significantly difficult to externally excite the single mode only in the multi-mode waveguide; and the tolerance is considerably narrow. This is because unless the electric field distribution of a beam spot of the externally incident light agrees with the electric field distribution of the single mode of the optical waveguide accurately, the excitation of multi-mode occurs easily. General lens coupling and optical fiber coupling are incapable of selectively exciting the single mode only in the multi-mode waveguide.

DISCLOSURE OF THE INVENTION

In order to cope with the above-stated problems, it is an object of the present invention to provide an optical waveguide device that enables the propagation of different wavelengths of light in a single mode, and to provide an optical waveguide laser using the same and an optical apparatus equipped with the same.

An optical waveguide device of the present invention includes a waveguide layer that converts a wavelength of incident light and emits converted light. The optical waveguide device includes a ridge waveguide provided in the waveguide layer; and slab waveguides formed on both sides of the ridge waveguide with recess portions intervening therebetween. The waveguide layer satisfies a multi-mode condition for the incident light, and light propagating through the ridge waveguide is in a single mode.

With the configuration provided with the slab waveguides on the both sides of the ridge waveguide with the recess portions intervening therebetween, an optical waveguide device can be realized that allows single-mode light to be excited selectively in spite of a multi-mode condition. Therefore, an optical waveguide device free from deterioration of properties resulting from a multi mode can be realized.

In the optical waveguide device of the present invention, it is preferable that the wavelength of the incident light be smaller than a wavelength of the converted light. Thereby, a high-efficiency wavelength conversion element can be realized.

In the optical waveguide device of the present invention, it is preferable that the waveguide layer be made of nonlinear optical crystals, and a wavelength of the converted light be twice the wavelength of the incident light. Thereby, a high-efficiency down conversion type optical waveguide device can be realized.

In the optical waveguide device of the present invention, preferably, the waveguide layer is made of nonlinear optical crystals, the incident light includes plural wavelengths of light, pump light as well as the incident light further is incident therein, and the converted light is difference-frequency light between the pump light and the incident light. Thereby, an optical waveguide device that is a wavelength conversion element utilizing difference frequency light can be realized.

In the optical waveguide device of the present invention, it is preferable that the ridge waveguide have a periodically domain-inverted structure. Thereby, a high-efficiency wavelength conversion element can be realized.

In the optical waveguide device of the present invention, preferably, the domain-inverted structure has two regions with different domain-inverted periods, the regions being provided in series in a direction of propagation of light. The incident light includes plural wavelengths of light. First pump light and second pump light further are incident as well as the incident light. Assuming that a region closer to an incident side of light out of the two regions is a first region and the other region is a second region, at the first region, the incident light is converted into difference-frequency light with respect to the first pump light, and at the second region, the difference-frequency light converted at the first region is converted into difference-frequency light with respect to the second pump light. Thereby, an optical waveguide device can be provided, in which the magnitude relationship in frequency does not change after the wavelength conversion of signal light.

In the optical waveguide device of the present invention, it is preferable that a width of the ridge waveguide be narrower than a width of the slab waveguides. Thereby, an effective refractive index of the ridge waveguide is smaller than an effective refractive index of the slab waveguides, and therefore guided light in a multi mode is absorbed to the slab waveguides. Thus, the propagation in a single mode can be generated effectively.

In the optical waveguide device of the present invention, it is preferable that the waveguide layer include a thin film made of nonlinear optical crystals. Since the waveguide configuration including thin-film crystals does not contain impurities in the waveguide, it can provide low loss, a high nonlinear optical constant and excellent resistance to optical damage. Thus, stable output properties can be obtained even in a difference-frequency device that requires guiding of high-power pump light.

In the optical waveguide device of the present invention, it is preferable that the thin film be bonded to an optical substrate. Alternatively, it is preferable that the thin film be joined directly to an optical substrate.

In the optical waveguide device of the present invention, it is preferable that two or more cladding layers be laminated. Thereby, in spite of a multi-mode condition, an optical waveguide device with a wide wavelength region enabling single-mode propagation can be realized.

In the optical waveguide device of the present invention, it is preferable that a cladding layer contacting with the ridge waveguide out of the cladding layers have a refractive index higher than those of other cladding layers. Further, it is preferable that the cladding layer contacting with the ridge waveguide include an oxide containing Nb.

In the optical waveguide device of the present invention, it is preferable that the waveguide layer have a stepped distribution of refractive index in a depth direction. Thereby, an optical waveguide device that enables the selective excitation of single-mode light can be realized.

An optical waveguide laser of the present invention includes: a light source; and the optical waveguide device according to any one of the above-stated configurations. In this optical waveguide laser, the waveguide layer of the optical waveguide device includes a laser medium. Thereby, a high-efficiency and stable optical waveguide laser can be realized.

It is preferable that the waveguide layer include at least one selected from the group consisting of Er, Nd, Pr and Tu.

An optical apparatus of the present invention includes the optical waveguide device according to any one of the above-stated configurations. Thereby, an optical apparatus enabling high-speed operation can be realized.

BRIEF DESCRIPTION OF DRAWINGS

FIG. 7A shows coupling power properties versus coupling misalignment between the optical waveguide device of one embodiment of the present invention and an optical fiber.

FIG. 7B shows coupling power properties versus coupling misalignment between a conventional multi-mode embedded type optical waveguide device and an optical fiber.

FIG. 8 is a perspective view showing the configuration of an optical waveguide laser according to one embodiment of the present invention.

BEST MODE FOR CARRYING OUT THE INVENTION

Figure 1:
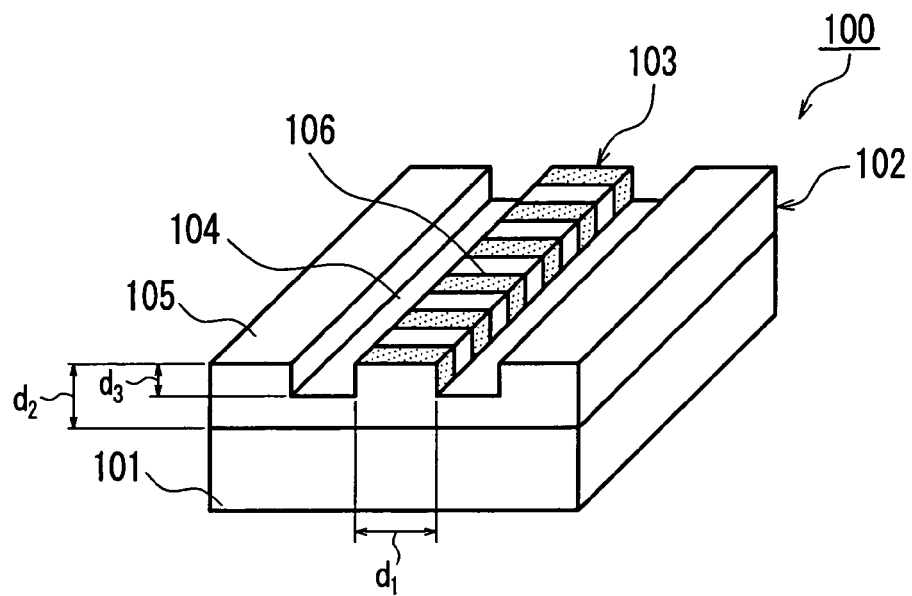
FIG. 1 is a perspective view showing the configuration of an optical waveguide device according to Embodiment 1.

Firstly, single mode and multi mode in a transverse mode of an optical waveguide will be described below. The electric field distribution of light propagating through a waveguide is determined by a refractive index, a shape and a size of the waveguide. By letting the shape of the waveguide have approximately the same size as that of the wavelength of the light, the electric field distribution of the light propagating through the waveguide can be discrete, thus enabling the separation to be a transverse mode. The waveguide whose waveguide shape is so small that only one transverse mode can be present therein is referred to as a single-mode waveguide, whereas the waveguide permitting the presence of two or more transverse modes is referred to as a multi-mode waveguide. The state where the waveguide size becomes too small to propagate light therein is referred to as a cut-off state. Although the single mode or the multi-mode of the waveguide can be chosen by the design of the shape and the refractive index of the waveguide, the wavelength of the light and the like, a general optical waveguide device is designed to have a single-mode condition for the guided wave. The single-mode condition is such that the waveguide cuts off light in a multi mode. Thus the light in a single mode only is guided in the optical waveguide. The major reasons for making a general optical waveguide device have a single-mode waveguide stem from the problems concerning coupling and the properties of the waveguide device.

Influences of the multi-mode waveguide upon the device properties stem from the presence of a plurality of guided light beams with different propagation constants (multi mode) in the waveguide. When controlling guided light in a certain way, if light beams with the plurality of propagation constants are present, such light beams have different influences, thus reducing the effect. For instance, in the case of an optical wavelength conversion element, the phase matching condition is varied in accordance with a propagation constant. Therefore the conversion efficiency deteriorates substantially. Also in the case of a switch exploiting an electro-optical effect or the like, the effect deteriorates similarly, thus greatly degrading a S/N ratio of the switching property. For those reasons, in devices using waveguides, single-mode propagation is used for restricting the propagating light to one mode with the intention of enhancing the device properties. However, the use of the single-mode waveguide is not absolutely essential. If it is possible to selectively excite a single mode in the multi-mode waveguide as well, the deterioration of the device properties can be prevented because such a waveguide exclusively permits light having one propagation constant like the single-mode waveguide.

Additionally, since an orthogonal relationship can be established, light is never converted in the waveguide from the single mode to the multi-mode, unless perturbation or the like is present. The biggest drawback of the multi-mode waveguide relates to coupling. When light is incident on an optical waveguide, guided light is excited by light collected by a lens or coupling by a fiber. If the waveguide and the incident light agree with each other in electric field distribution, the guided light can be excited with high efficiency. If exactly the same electric field distribution as the electric field distribution in the single mode can be excited externally, even the multi-mode waveguide allows the selective excitation of a single mode only.

However, in fact, it is extremely difficult to make the complete agreement between modes of the electric field distribution, and tolerances such as coupling misalignment also become extremely strict. Those facts cause guided light in a multi mode to be excited easily, thus making it difficult to establish the excitation in a single mode only. Further, a generally used optical waveguide, exploiting proton-exchange or diffusion of Ti or the like, has a graded refractive-index distribution that is asymmetrical in the depth direction. Therefore, the guided mode also has a complicated asymmetric configuration, which makes it more difficult to establish the single-mode excitation in the multi-mode waveguide.

For those reasons, in the case where incident light and guided light are substantially equal in wavelength, the waveguide is designed to have a configuration offering a single-mode condition to such light for allowing the single mode only to be guided. However, in the case where it is required to guide substantially different wavelengths of light and to launch short-wavelength light as incident light, the problem of deterioration in device properties will arise.

The following describes embodiments of the present invention specifically, which enables single-mode propagation of different wavelengths of light and is free from deterioration in device properties.

Embodiment 1

Referring to FIG. 1, an optical waveguide device according to Embodiment 1 of the present invention will be described below. FIG. 1 is a perspective view showing the configuration of the optical waveguide device according to Embodiment 1. In FIG. 1, the optical waveguide device 100 is configured so that a waveguide layer 102 made of proton-exchanged $LiNbO_3$ is formed on a substrate 101 made of $LiNbO_3$. Two recess portions 104 are formed in the waveguide layer 102, and a ridge waveguide (optical waveguide) 103 is formed between these recess portions 104. A slab waveguide 105 is formed on the outer side of each of the two recess portions 104. In other words, the waveguide layer 102 is configured so that the slab waveguides 105 are formed on both sides of the ridge waveguide 103 with the recess portions 104 intervening therebetween.

A periodically domain-inverted structure 106 is formed in the ridge waveguide 103. Since a non-annealed proton-exchanged waveguide structure is employed, the refractive index has a stepped distribution in the depth direction.

Such a configuration of the waveguide layer 102 in the optical waveguide device 100 enables the selective excitation of single-mode guided light even in a multi-mode waveguide structure. In order for light with a wavelength in 1.56 μm-band to be guided through the ridge waveguide 103, a width $d_1$ of the ridge waveguide is set at 6 μm, a depth $d_2$ of the waveguide layer is set at 5 μm, and a depth $d_3$ of the recess portions is set at 2 μm. This waveguide layer 102 could offer a single-mode condition to the light with a wavelength of 1.56 μm.

Next, a coupling experiment was conducted, where infrared light with a wavelength of 0.78 μm was incident on the waveguide layer 102 using a light-collecting system such as a lens. The waveguide layer 102 offered a secondary transverse mode multi condition (in addition to the single mode, higher order of multi-mode, such as the first and the second, can propagate) to the light with a wavelength of 0.78 μm. From this coupling experiment, it was found that every light coupling with the waveguide layer 102 was in a single mode, therefore in spite of the multi-mode condition, single-mode light could be excited selectively. The reason of this was analyzed based on mode profile. The following describes this reason.

Figure 2A:
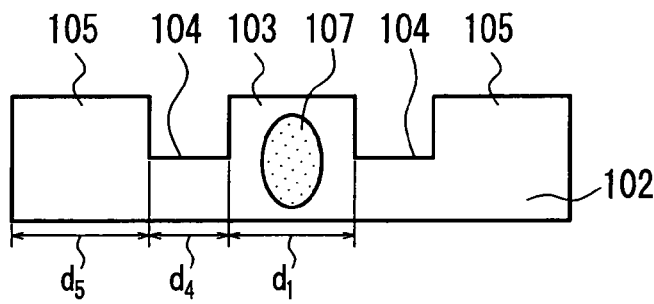
FIG. 2A schematically shows the electric field distribution in a zero-order mode at the incident end face of the optical waveguide device according to Embodiment 1.
Figure 2B:
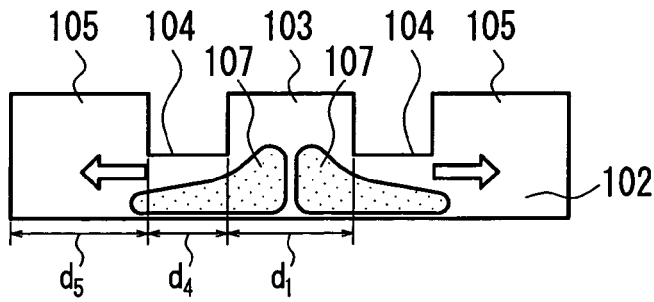
FIG. 2B schematically shows the electric field distribution in a first-order mode at the incident end face of the optical waveguide device according to Embodiment 1.
Figure 2C:
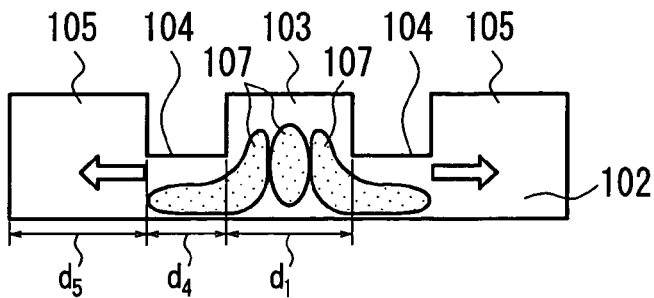
FIG. 2C schematically shows the electric field distribution in a second-order mode at the incident end face of the optical waveguide device according to Embodiment 1.

FIG. 2A, FIG. 2B and FIG. 2C schematically show the electric field distribution at the incident end face of the optical waveguide device according to Embodiment 1. Analyzing the mode of the light propagating through the waveguide layer 102 from the shape of the waveguide, it became evident that, as shown in FIG. 2A, FIG. 2B and FIG. 2C, the mode having three types of electric field distribution was excited. FIG. 2A, FIG. 2B and FIG. 2C show the electric field distribution in a zero-order mode (single mode), a first-order mode and a second-order mode, respectively. As can be seen from the drawings, in the case of the multi-mode shown in FIG. 2B and FIG. 2C, the electric field 107 bleeds widely to the waveguide layer beneath the recess portions 104. Further, the electric field 107 in the multi-mode is absorbed to the slab waveguides 105 formed on the outer sides of the recess portions. It was found that such phenomena led to a significantly increase of propagation loss in the waveguide layer 102. Since the slab waveguides 105 have an effective refractive index larger than that of the ridge waveguide 103, the light bleeding to the slab waveguides 105 promptly is absorbed to the slab waveguides 105, which causes the loss in the waveguide. That is to say, it can be understood that although the multi-mode does exist in the waveguide layer 102 of Embodiment 1, the propagation loss is considerably large, so that the excitation in the multi-mode hardly occurs. When light is incident on the waveguide layer 102, the multi-mode light is radiated at the coupling portion with the incident light. Therefore, the single mode is excited selectively under the condition allowing the coupling efficiency to be maximized. That is to say, since the waveguide layer 102 of the optical waveguide device 100 according to Embodiment 1 has a considerably large propagation loss of the multi-mode light, it is capable of selectively exciting the single-mode light in spite of the multi-mode condition.

Herein, it is preferable that the width $d_1$ of the ridge waveguide 103 be narrower than the width $d_5$ of the slab waveguides 105. An effective refractive index of a waveguide depends on a refractive index and a shape of a material making up the waveguide. When the width $d_1$ of the ridge waveguide 103 is narrower than the width $d_5$ of the slab waveguides 105, the effective refractive index of the ridge waveguide 103 is smaller than the effective refractive index of the slab waveguides 105. As a result, the light bleeding to the slab waveguides 105 promptly is absorbed to the slab waveguides 105, which causes the loss in the waveguide. In this way, when the width $d_1$ of the ridge waveguide 103 is narrower than the width $d_5$ of the slab waveguides 105, the propagation loss of the multi-mode light is considerably large. For that reason, the single-mode light can be excited selectively in spite of the multi-mode condition.

In this waveguide layer 102, it is desirable that the width $d_4$ of the recess portions 104 be larger than 50% of the width $d_1$ of the ridge waveguide 103 and not more than about 200% of the same. In the case of a too wide width, the ridge waveguide 103 becomes unaffected, so that the propagation loss in the multi-mode does not increase. On the other hand, a width not more than 50% significantly affects the propagation of light in the ridge waveguide 103, thus increasing the propagation loss of the single mode as well.

It should be noted here that the stepped distribution of the refractive index of the ridge waveguide 103 also is the reason for allowing the selective excitation of the single-mode light in the waveguide layer 102. This will be described below more specifically. If the ridge waveguide 103 has a graded distribution of the refractive index, the refractive index becomes smaller steplessly from a surface of the ridge waveguide 103 toward a lower portion thereof. Therefore, the waveguide mode is confined with a center in the vicinity of the surface of the ridge waveguide 103. For that reason, the multi mode also has an electric field distribution biased toward the vicinity of the surface, so that the leakage to the slab waveguides 105 via the waveguide layer beneath the recess portions 104 becomes significantly small even in an optical waveguide configuration similar to that of Embodiment 1. Therefore, the propagation loss of the multi mode is decreased, which makes it difficult to excite selectively the single mode only.

As stated above, in the optical waveguide device of Embodiment 1, the single mode light can be excited selectively in spite of the multi-mode condition.

Further, when this optical waveguide device 100 with a ridge waveguide configuration is allowed to have a double-cladding configuration, the wavelength area permitting the single-mode propagation further can be expanded even in a waveguide in the multi-mode condition.

Figure 3A:
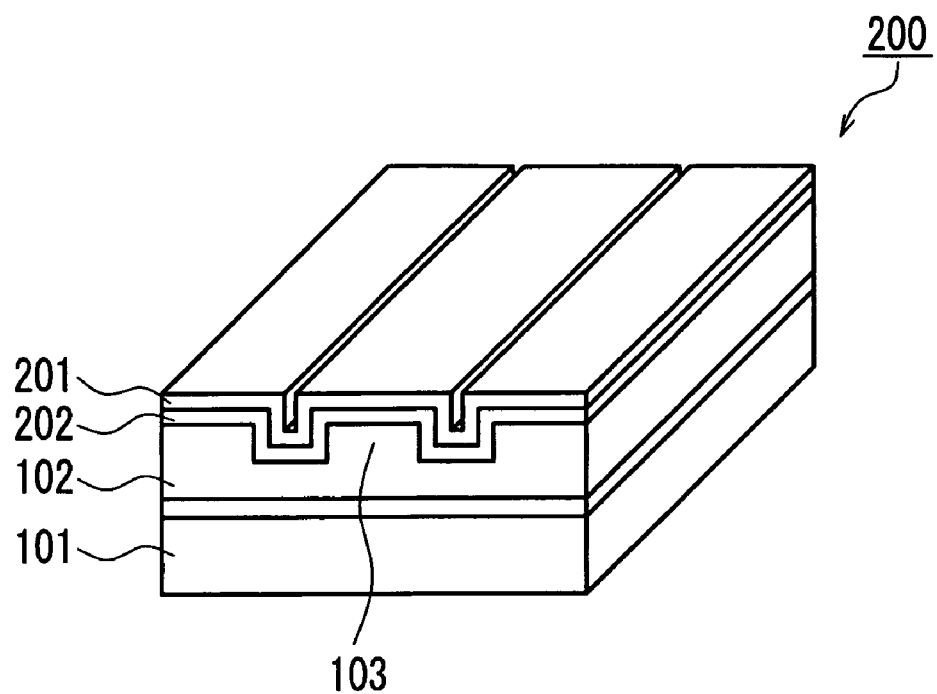
FIG. 3A is a perspective view showing the configuration of an optical waveguide device with a double cladding configuration.
Figure 3B:
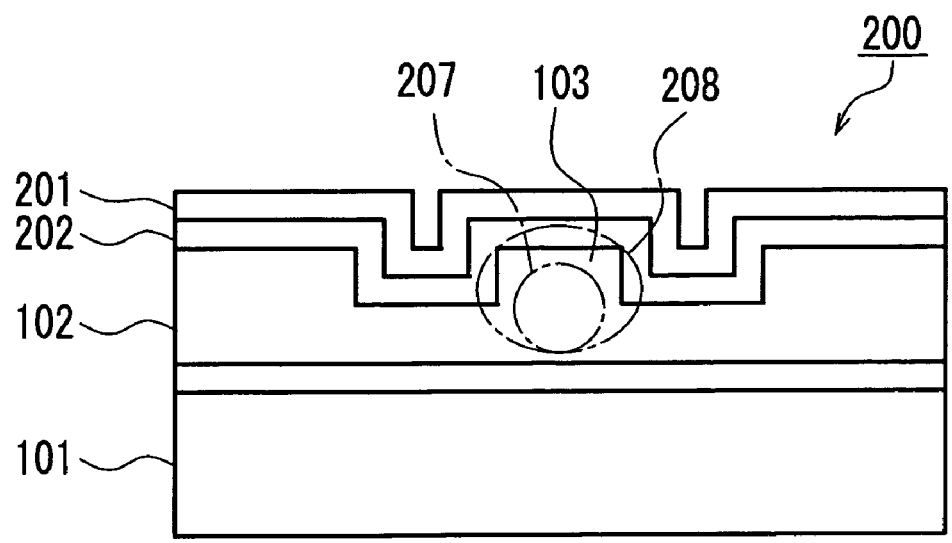
FIG. 3B shows an incident end face of the optical waveguide device with a double cladding configuration.

The following describes the optical waveguide device with a double cladding configuration, with reference to FIG. 3A and FIG. 3B. FIG. 3A is a perspective view showing the configuration of the optical waveguide device with a double cladding configuration. FIG. 3B shows an incident end face of the optical waveguide device with a double cladding configuration. The optical waveguide device 200 with a double cladding configuration enables the mitigation of the condition for the single-mode propagation.

As shown in FIG. 3A, the optical waveguide device 200 is configured so that a double-layered cladding (cladding 201 and cladding 202) is provided as a cladding layer of the ridge waveguide 103. It is preferable that the cladding 202, which contacts with the ridge waveguide 103, be made of a material having a refractive index closer to that of the ridge waveguide 103. For example, a possible configuration may include an oxide containing Nb. More specifically, a mixed film of $Nb_2O_5$ and $Ta_2O_5$ can be used for a high refractive index material having a high transmission property.

In the thus configured optical waveguide device 200, two types of light having different wavelengths can propagate. Further, such different types of light propagate at different regions. For instance, when light with a wavelength of 0.78 µm and light with a wavelength of 1.56 µm are propagated, as shown in FIG. 3B, the light having a shorter wavelength (wavelength of 0.78 µm) is guided at a region 207 in the ridge waveguide 103, whereas the light having a longer wavelength (wavelength of 1.56 µm) is guided at a region 208 including the cladding layer 202.

The optical waveguide device 200 with a double-cladding ridge waveguide configuration as described above can provide the mitigation of the condition for the single-mode propagation. In this way, the double-layered cladding provided in the optical waveguide device of Embodiment 1 further can enhance the performance.

Further, the optical waveguide device of Embodiment 1 is effective also for the generation of harmonics. In the case of the generation of second and third-order harmonics, since the wavelength of incident light is longer than that of the converted light, an optimum design is possible for the incident light, which facilitates the realization of the single mode. However, the design in the multi-mode condition allows the propagation loss in the optical waveguide to be decreased greatly, and therefore the configuration of the present invention is effective for achieving high efficiency.

Embodiment 2

The following describes an optical waveguide device according to Embodiment 2 of the present invention. Embodiment 2 relates to an optical waveguide device of a down conversion type. The down conversion type refers to devices that convert light having a wavelength of λ into light having a wavelength of 2λ.

In the case of a conventional waveguide device, since the wavelength λ of incident light is shorter than the wavelength 2λ of converted light, when the waveguide condition is designed so as to match with the converted light, the multi-mode condition is offered to the incident light. Alternatively, when the optical waveguide is designed in the single mode so as to match with the wavelength of λ, the light of 2λ is cut off, which makes it impossible to implement the device.

The optical waveguide device of Embodiment 2 allows the light having a wavelength of λ to be converted into the light having a wavelength of 2λ. The optical waveguide device of Embodiment 2 has a configuration similar to that of the optical waveguide device of Embodiment 1 shown in FIG. 1. The optical waveguide device of the down conversion type having this configuration was manufactured actually. A Mg-doped LiNbO$_3$ substrate was used as a substrate forming the waveguide layer 102, and a periodically domain-inverted structure was formed in the ridge waveguide 103.

When light with a wavelength of 0.4 μm was incident on this waveguide layer 102, the periodically domain-inverted structure (period: about 2.7 μm) allowed the light to be converted into infrared light of a wavelength of 0.8 μm. The ridge waveguide 103 was configured to have a ridge waveguide width $d_1$ of about 4 μm. The waveguide layer 102 was configured to have a straight optical waveguide, but was not provided with a tapered configuration that was for allowing a single mode by controlling the coupling property of light. The waveguide layer 102 offered a multi-mode condition to blue light with a wavelength of 0.4 μm, but the blue light with a wavelength of 0.4 μm was allowed to be incident selectively in a single mode state using a light-collecting system including the combination of lenses. The coupling efficiency was 80%, and the waveguide in a multi mode was not observed. Also, the tolerance of coupling was not different from that in the case of the excitation in the single-mode waveguide.

The conversion efficiency of the down conversion was about 10%, and the light with a wavelength of 0.4 μm propagated in the single-mode through the waveguide layer 102. Further, since the distribution of refractive index was a stepped form, large overlap with the light with a wavelength of 0.8 μm could be obtained, thus achieving the conversion with high efficiency. Herein, the device length was 10 mm.

When a taper or the like is to be formed, about 1 to 2 mm normally is required as a space for the taper portion, thus degrading the efficiency by 10 to 20%. Additionally, it is difficult for the taper to convert a waveguide mode with efficiency, and therefore the efficiency will be degraded further, which leads to a poor manufacturing yield.

On the other hand, the waveguide layer 102 of Embodiment 2 has a simple shape, and therefore a high yield and a high-efficiency conversion property with good repeatability could be obtained. The waveguide layer 102 can be used for realizing a high-efficiency optical waveguide device in a down conversion type.

Embodiment 3

The following describes an optical waveguide device according to Embodiment 3 of the present invention. The optical waveguide device of Embodiment 3 is a difference-frequency device.

In wavelength multiplexing optical communication, an optical router is required, which converts a wavelength of light conveying a signal. Currently, light is converted into an electrical signal once, which is then converted into light again, whereby the wavelength is converted. However, in order to realize a high speed, optical-optical wavelength conversion is required. In order to realize this, wavelength conversion utilizing difference-frequency is effective. For instance, when light with a wavelength in 1.56-μm band as signal light and light with a wavelength in 0.78-μm band as pump light are incident as incident light on a difference-frequency device, the signal light can be converted into difference-frequency light of the pump light with a wavelength of 0.78 μm. Further, wavelengths of light in the vicinity of 1.56 μm can be converted collectively into difference-frequency light.

Figure 4A:
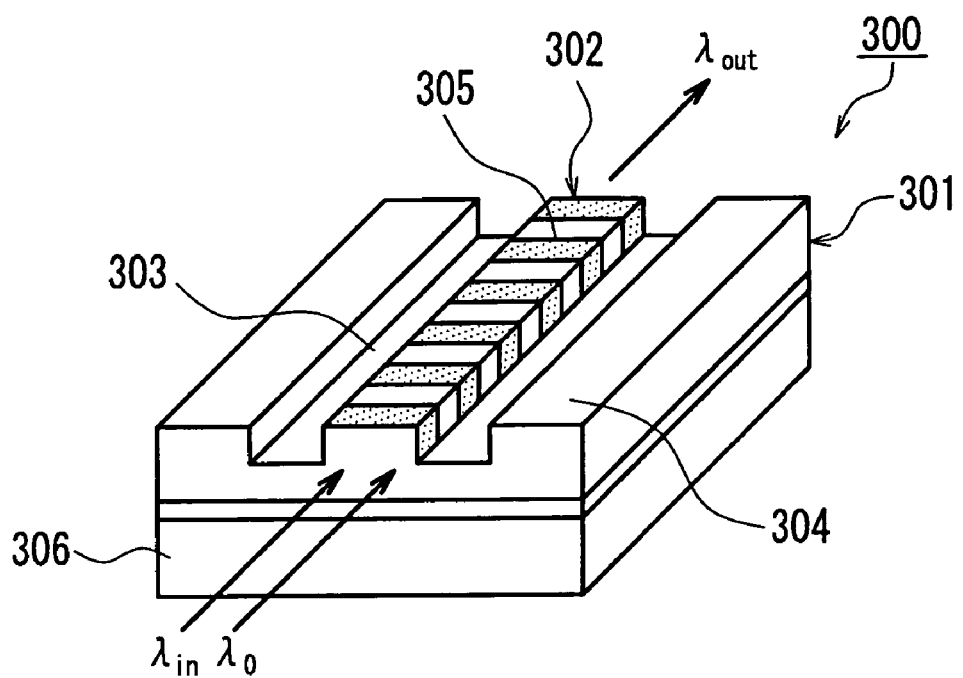
FIG. 4A is a perspective view showing the configuration of an optical waveguide device according to Embodiment 3.
Figure 4B:
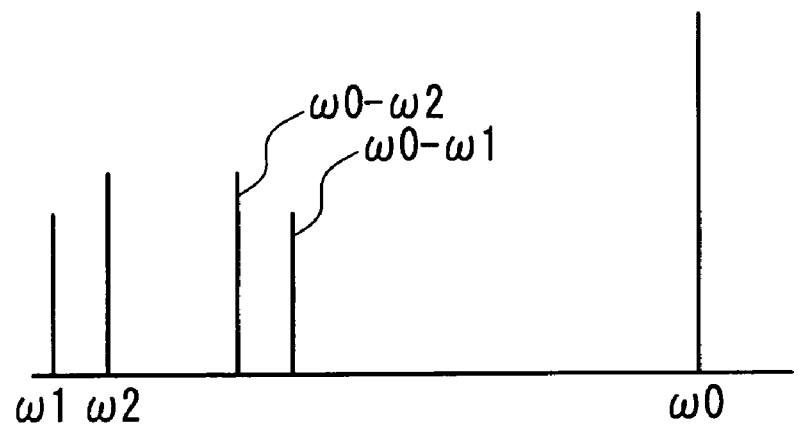
FIG. 4B shows a relationship between the frequencies of signal light and difference-frequency light and their intensities in the optical waveguide device according to Embodiment 3.

Referring now to FIG. 4A and FIG. 4B, the wavelength conversion by the optical waveguide device according to Embodiment 3 will be described below. FIG. 4A is a perspective view showing the configuration of the optical waveguide device according to Embodiment 3, and FIG. 4B shows a relationship between frequencies of signal light and difference-frequency light and their intensities in the optical waveguide device according to Embodiment 3.

The optical waveguide device 300 of Embodiment 3 has a configuration similar to that of the optical waveguide device 100 of Embodiment 1 shown in FIG. 1. The optical waveguide device 300 is provided with a waveguide layer 301 made of MgO-doped LiNbO$_3$. The waveguide layer 301 is provided with: a ridge waveguide 302 having a periodically domain-inverted structure 305; recess portions 303; and slab waveguides 304, and is formed on a substrate 306. When light with a wavelength of $\lambda_0$ as pump light and plural light beams with a wavelength of $\lambda_{in}$ as signal light are incident on the waveguide layer 301, then difference-frequency light $\lambda_{out}$ between the wavelengths $\lambda_{in}$ and $\lambda_0$ will be emitted. When light with a frequency of $\omega 0 = 2\pi/\lambda_0$ as pump light and two beams of light with a frequency of $\omega 1 = 2\pi/\lambda_1$ and a frequency of $\omega 2 = 2\pi/\lambda_2$ as signal light are incident on the waveguide layer 301, then the signal light with a frequency of $\omega 1$ will be converted into light with a frequency of $(\omega 0 - \omega 1)$, and the signal light with a frequency of $\omega 2$ is converted into light with a frequency of $(\omega 0 - \omega 2)$. In other words, the signal light is converted into the difference-frequency light of the pump light. FIG. 4B shows spectra of the thus described light. The horizontal axis shows frequencies and the vertical axis shows intensities of light. In this way, the optical waveguide device 300 can be used as a difference-frequency device.

The following assumes the case of the optical waveguide device with a ridge waveguide configuration formed in a waveguide layer made of Mg-doped LiNbO$_3$ and having a periodically domain-inverted structure. This waveguide is required to guide light with a wavelength in 1.56-μm band, and therefore a multi-mode condition is offered to pump light with a wavelength of 0.78 μm. However, the optical waveguide device 300 of Embodiment 3 allows the pump light to be guided in a single mode, whereby wavelength conversion can be realized with high efficiency, in which a device length is 10 mm and a conversion efficiency of 90% or more can be realized.

Figure 5A:
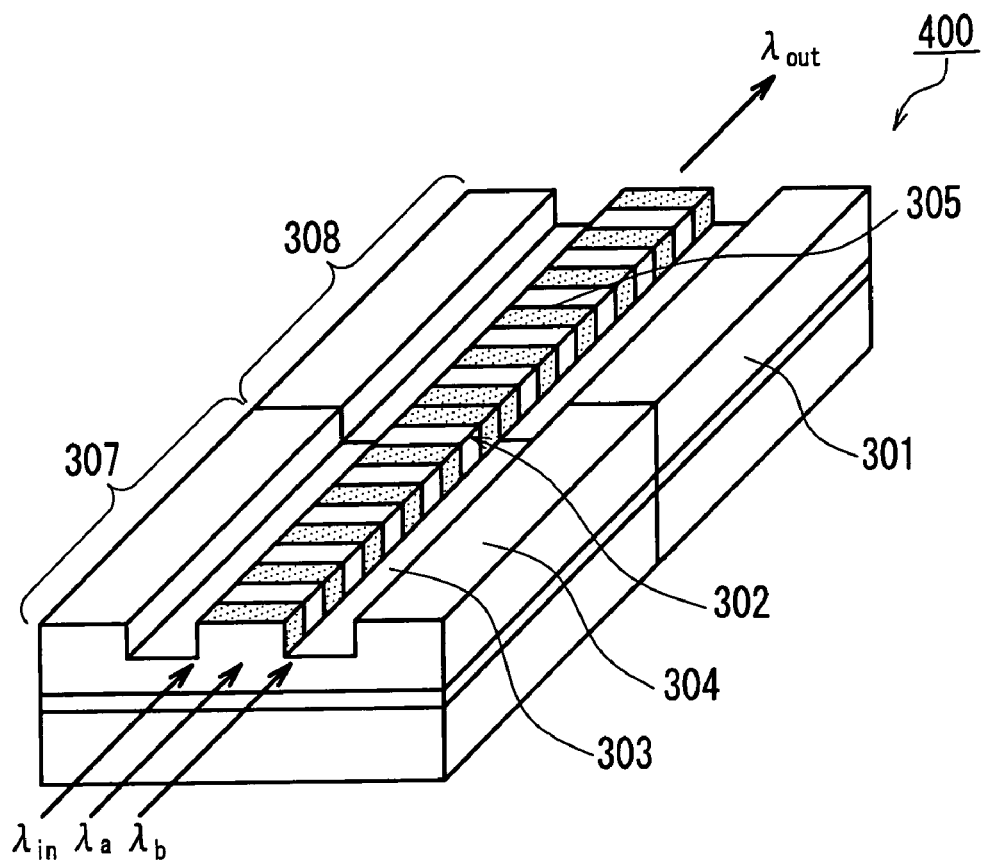
FIG. 5A is a perspective view showing the configuration of another optical waveguide device according to Embodiment 3.
Figure 5B:
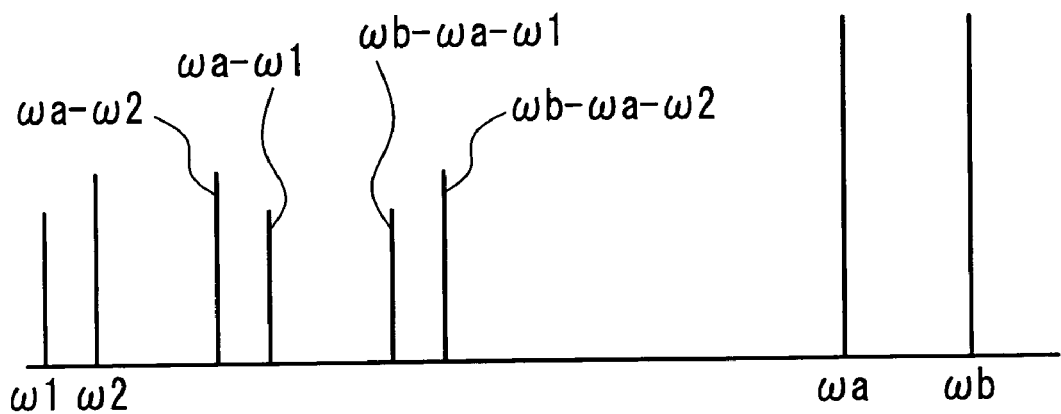
FIG. 5B shows a relationship between the frequencies of signal light and difference-frequency light and their intensities in another optical waveguide device according to Embodiment 3.

Another possible embodiment of the present invention is an optical waveguide device as a difference-frequency device, in which the domain-inverted structure 305 in the ridge waveguide 302 has a domain-inverted period changing halfway on the waveguide. This optical waveguide device will be described below, with reference to FIG. 5A and FIG. 5B. FIG. 5A is a perspective view showing the configuration of another optical waveguide device according to Embodiment 3. FIG. 5B shows a relationship between frequencies of signal light and difference-frequency light and their intensities in such an optical waveguide device according to Embodiment 3.

In the case of the optical waveguide device 300 shown in FIG. 4A, the signal light with a frequency of $\omega1$ is converted into the light with a frequency of $(\omega0-\omega1)$, and the signal light with a frequency of $\omega2$ is converted into the light with a frequency of $(\omega0-\omega2)$ as shown in FIG. 4B. Although $\omega1$ is smaller than $\omega2$, $(\omega0-\omega1)$ is larger than $(\omega0-\omega2)$. Therefore, the magnitude in frequency of the signal light is reversed after the conversion.

In the optical waveguide device 400 shown in FIG. 5A, the magnitude in frequency of the signal light is not reversed even after the conversion. The optical waveguide device 400 has different domain-inverted periods of the domain-inverted structure 305 in the ridge waveguide 302 between a first region 307 and a second region 308.

Plural light beams $(\lambda_{in})$ with different wavelengths as signal light and light beams with wavelengths of $\lambda_a$ and $\lambda_b$ as pump light are incident on the optical waveguide device 400. When light with a frequency of $\omega1$ and light with a frequency of $\omega2$ are incident as signal light $(\lambda_{in})$ on the ridge waveguide 302, such light firstly is converted at the first region 307 into difference-frequency light between such signal light and the pump light with a wavelength of $\lambda a$ (frequency $\omega a$), where the difference-frequency light has frequencies of $(\omega a-\omega1)$ and $(\omega a-\omega2)$. Herein, the domain-inverted period of the first region 307 is designed so that the phase matching of the pump light $\omega a$ and the signal light is enabled.

Next, this difference-frequency light is incident on the second region 308, where conversion into difference-frequency light from the pump light with a wavelength of $\lambda_b$ (frequency $\omega b$) is carried out, where the difference-frequency light has frequencies of $(\omega b-\omega a+\omega1)$ and $(\omega b-\omega a+\omega2)$. Herein, the domain-inverted period of the second region 308 is designed so that the phase matching of the pump light $\omega b$ and the difference-frequency light from the first region 307 is enabled. In this way, signal light is converted twice into difference-frequency light.

FIG. 5B shows the above-stated relationship. As shown in the drawing, the magnitude relationship in wavelength of the final converted light is the same as the magnitude relationship of the signal light. That is, since $(\omega b-\omega a+\omega1)$ is smaller than $(\omega b-\omega a+\omega2)$, their magnitude relationship is the same as the magnitude relationship of $\omega1$ and $\omega2$ of the original signal light. Therefore, the optical waveguide device 400 can be used for converting wavelengths collectively without changing the magnitude relationship in wavelength of signal light.

Figure 6A:
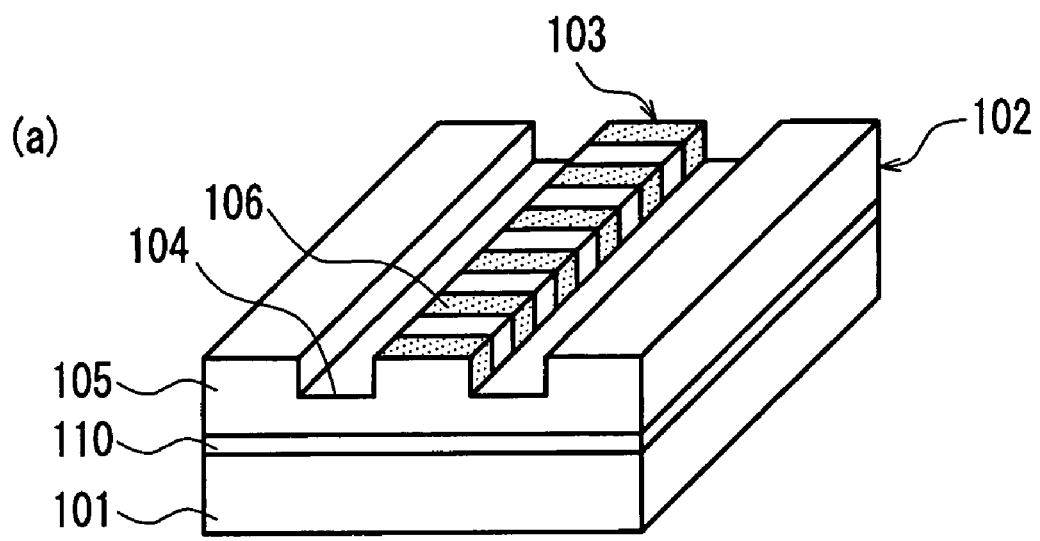
FIG. 6A is a perspective view showing the configuration of still another optical waveguide device according to Embodiment 3.
Figure 6B:
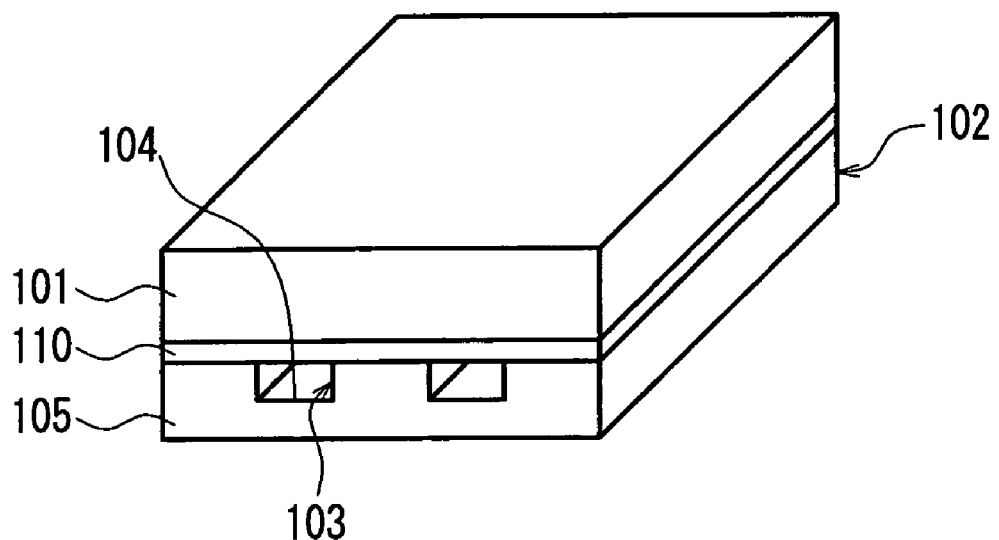
FIG. 6B is a perspective view showing the configuration of a further optical waveguide device according to Embodiment 3.

Although Embodiment 3 shows the ridge waveguide configuration formed in the proton-exchanged layer as the optical waveguide configuration, another possible waveguide configuration may include an epi substrate or thin-film nonlinear optical crystals. That is, nonlinear optical crystals are bonded or directly joined to an optical substrate, which is ground to be thin (optical thin film) so as to form a waveguide layer, and the waveguide layer further is processed into ridge, whereby an optical waveguide can be formed. For instance, FIG. 6A and FIG. 6B exemplify two configurations of such an optical waveguide device. The optical waveguide device shown in FIG. 6A is configured so that a waveguide layer 102 is bonded on a substrate 101 made of LiNbO$_3$ via an adhesive 110. The waveguide layer 102 is formed as follows: a MgO-doped LiNbO$_3$ substrate having a periodically domain-inverted structure 106 is made thinner, to which ridge-processing is performed so as to form: two recess portions 104; a ridge waveguide (optical waveguide) 103 sandwiched between these recess portions 104; and slab waveguides 105 on the outer sides of the two recess portions 104. The optical waveguide device shown in FIG. 6B is configured so that a substrate 101 is bonded to the thus formed waveguide layer 102 via the adhesive 110 on the side where the recess portions 104 are formed.

Since the waveguide configuration including thin-film crystals does not contain impurities in the waveguide, it can realize a high efficiency difference-frequency down-conversion device having low loss and a high nonlinear optical constant. Further, since such a configuration has excellent resistance to optical damage, stable output properties can be obtained even in a difference-frequency device that requires guiding of high-power pump light. As the waveguide layer 102, glass, silicon, laser media, semiconductors and the like are available in addition to the nonlinear materials. As long as a material is transparent to guided light, a waveguide can be implemented by processing it into a shape of the waveguide. It should be noted here that the optical substrate refers to a substrate whose surface is ground with high precision not more than the order of the wavelength of light.

In the above description, two types of wavelengths of light are exemplified as the signal light. In the case of wavelength multiplexing, however, a large number of signal light beams with plural different wavelengths are used. The optical waveguide device of Embodiment 3 allows the wavelength conversion of these wavelengths collectively. The wavelength range permitting the wavelength conversion depends on the domain-inverted periodic structure. Additionally, in order to increase the phase-matching wavelength range, instead of a uniform period of the periodic structure of the domain-inversion, a partially modulated periodic structure also is effective.

Further, it is preferable that the wavelengths $\lambda_a$ and $\lambda_b$ be different values and the phase-matching wavelengths at the regions 307 and 308 be designed differently so as to allow the phase-matching of these wavelengths of light (see FIG. 5A). This configuration can prevent the signal light from being converted into a wavelength different from the intended one. Thus, the generation of noise and deterioration of a signal intensity also can be prevented.

The above Embodiments 1 to 3 exemplify the ridge waveguide made of LiNbO$_3$ crystals in the optical waveguide device. In addition, nonlinear materials such as LiTaO$_3$ and KTP may be used for forming the ridge waveguide.

Further, it is preferable that the waveguide layer be configured with an off-cut substrate for the purpose of higher efficiency of the optical waveguide device. By using an off-cut substrate to form a domain-inverted structure, a thickness of the domain inversion can be increased, thus increasing the overlap with the optical waveguide, so that conversion efficiency can be enhanced. Assuming that an off-cut angle is defined as $\theta$ where $\theta$ denotes the angle of the rotation of X and Z axes around the crystal Y axis in a X-cut crystal, the thickness of domain inversion increases with the off-cut angle. A preferable off-cut angle $\theta$ is about 3° to 15°.

Further, the waveguide layer may be formed with a Z-cut substrate. The Z-cut substrate is effective, because it enables the deep domain inversion and a wider region for forming the domain inversion. Herein, in this case, a $\lambda/2$ plate is necessary for allowing the matching in polarization with a semiconductor laser. Some 1.5-μm band lasers for communication have a divergence angle of an outgoing beam controlled to have approximately the same angle vertically and horizontally. Therefore, when such lasers are used, a $\lambda/2$ plate becomes unnecessary, which is effective for reducing cost.

As a method for letting plural light beams with different wavelengths be incident in the optical waveguide, the plural light beams may be multiplexed in one optical path using an optical filter, followed by letting them be incident in the waveguide using a light-collecting system. The optical waveguide devices of the present invention facilitate the single-mode excitation of light beams with different wavelengths, and therefore the single-mode excitation with efficiency is enabled by optical excitation using a light-collecting system.

Further, as a method for exciting light beams with plural wavelengths, an optical fiber coupler may be used. Light beams with different wavelengths are multiplexed in one optical fiber using an optical fiber coupler, which then is coupled to the optical waveguide of the present invention. Optical fiber couplers, which are commercially available, are capable of multiplexing different wavelengths with efficiency. The optical fiber may be coupled directly with an end face of the ridge waveguide. In this way, an optical fiber coupler allows the multiplexed light to be coupled with the optical waveguide efficiently. The coupling efficiency at this time is 80% or more, and a large tolerance can be obtained for the coupling misalignment between the optical waveguide and the optical fiber. FIG. 7A shows coupling power properties versus coupling misalignment between the optical waveguide device of one embodiment of the present invention and an optical fiber. FIG. 7B shows coupling power properties versus coupling misalignment between a conventional multi-mode embedded type optical waveguide device and an optical fiber.

Misalignment on the horizontal axis shows the displacement in the width direction of the waveguide. As shown in FIG. 7B, even when the optical fiber and the optical waveguide are adjusted at their optimum positions, the zero-order mode and the first-order mode propagate simultaneously due to a difference in the electric field of the mode of the propagation in the optical waveguide and the electric field of the propagation in the optical fiber. Moreover, it can be understood from FIG. 7B that if the optical fiber is displaced slightly from the optimum value of the coupling position, the percentage of the first-order mode would increase and the zero-order mode would decrease greatly. In this way, in the conventional multi-mode waveguide, it is extremely difficult to selectively guide the single mode, and the misalignment accelerates the tendency toward the multi mode. Therefore, the adjustment in such a waveguide is considerably difficult. On the other hand, as shown in FIG. 7A, the optical waveguide device according to one embodiment of the present invention has the coupling properties with a suppressed tendency toward the multi mode for the misalignment. For that reason, single-mode excitation can be made easily even in a multi-mode waveguide, and a large tolerance for misalignment can be provided.

It should be noted here that the properties concerning the optical fiber coupling apply similarly to the coupling properties of the waveguide using a light-collecting system.

The above-described embodiments exemplify the optical waveguide devices using a straight waveguide. However, in addition to this, optical waveguide configurations using Y-branch, a directional coupler and a bend waveguide also are available.

The optical waveguide devices according to embodiments of the present invention can be used effectively for optical waveguide lasers, optical amplification waveguides and optical waveguide devices that control plural light beams, for example. Waveguide lasers and waveguide amplifiers require shortwave light as pumping light and generate long wave light as laser light or optical amplification. Optical waveguide lasers can be implemented by using laser media doped with Er, Nd, Ps, Tu and the like as the waveguide layer of the optical waveguide device according to embodiments of the present invention. The optical waveguide lasers provide guided light (laser light) with a longer wavelength relative to incident light (pump light), and offers a multi mode to the incident light because of the design of the waveguide. However, when the pump light is propagated in a multi mode, the pump efficiency is degraded greatly. For avoiding this, the optical waveguide devices according to the present embodiment are significantly effective.

FIG. 8 is a perspective view showing the configuration of an optical waveguide laser 500 using the optical waveguide device according to one embodiment of the present invention. The optical waveguide laser 500 of the present embodiment is configured as shown in FIG. 8 so that a semiconductor laser 501 is provided at an end portion of the optical waveguide device 100 according to Embodiment 1 shown in FIG. 1, for example. Light emitted from the semiconductor laser 501 is incident on the optical waveguide device 100, and high-efficiency laser light is emitted from the optical waveguide device 100. Single-mode propagation is possible for both of the pump light and the laser light, and therefore a high-efficiency waveguide laser can be realized.

Embodiment 4

Figure 9:
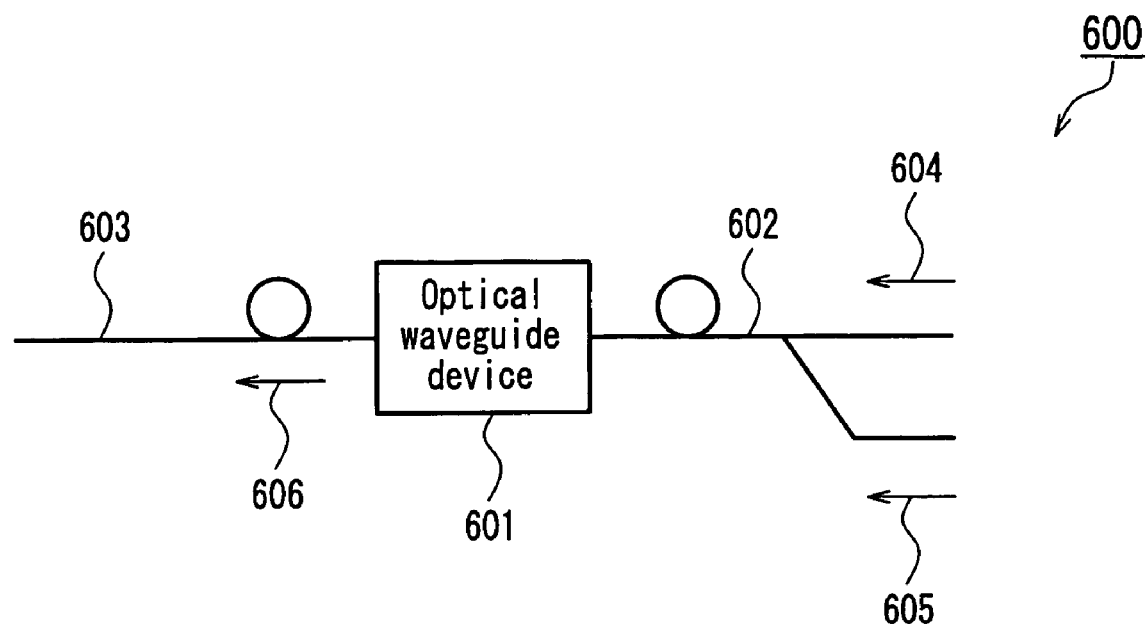
FIG. 9 schematically shows the configuration of an optical waveguide apparatus according to Embodiment 4.
Figure 10:
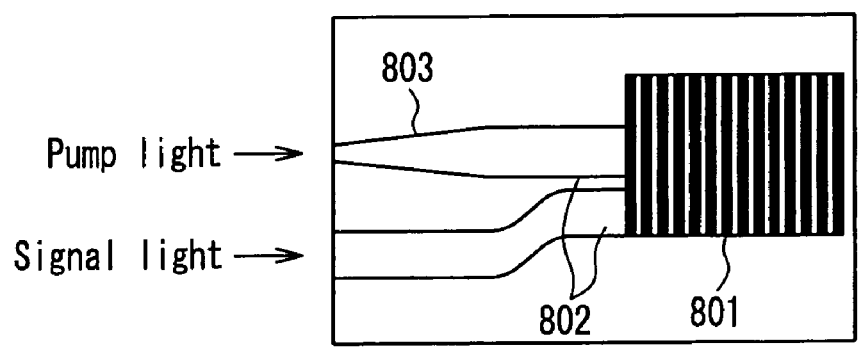
FIG. 10 schematically shows a configuration of a conventional optical waveguide device.

The following describes an optical apparatus according to Embodiment 4 of the present invention. By coupling optical fibers with incident and outgoing end faces of the optical waveguides of the optical waveguide devices of Embodiments 1 to 3, various optical apparatuses can be implemented. For instance, in wavelength multiplexing communication, plural wavelengths of light can be converted into other wavelengths collectively. Further, the wavelength conversion is performed at a significantly high speed because it utilizes a nonlinear optical effect, and therefore such an optical apparatus is significantly effective for high-speed communication. FIG. 9 schematically shows the configuration of the optical apparatus according to Embodiment 4. The optical apparatus 600 according to Embodiment 4 is provided with, for example, an optical waveguide device 601, an optical fiber 602 and an optical fiber 603. The optical fiber 602 is provided so as to be coupled with an incident end of the optical waveguide device 601, and is branched in two fibers. The optical fiber 603 is provided so as to be coupled with an outgoing end of the optical waveguide device 601. Plural input signal beams 604 are input to the optical waveguide device 601 from one of the optical fiber branches 602. Pump light 605 is input to the optical waveguide device 601 from the other of the optical fiber branches 602. Wavelengths of the plural input signal light beams 604 are converted by the optical waveguide device 601. Plural output light beams 606 subjected to the wavelength conversion are output to the optical fiber 603 from the outgoing end of the optical waveguide device 601.

Herein, as the optical waveguide device 601, one of the optical waveguide devices shown in Embodiments 1 to 3 may be used.

As stated above, according to the present invention, an optical waveguide device can be provided, which allows single-mode light to be excited selectively in spite of an optical waveguide in a multi-mode condition, and an optical waveguide laser using the same and an optical apparatus equipped with the same can be provided.

INDUSTRIAL APPLICABILITY

The optical waveguide device of the present invention, the optical waveguide laser using the same and the optical apparatus equipped with the same can be used, for example, in the optical information processing field and the optically applied measurement and controlling field.

The invention claimed is:

1. An optical waveguide device including a waveguide layer that converts a wavelength of incident light and emits converted light, the optical waveguide device comprising:
    a ridge waveguide provided in the waveguide layer; and
    slab waveguides formed on both sides of the ridge waveguide with recess portions intervening therebetween,
    wherein the waveguide layer satisfies a multi-mode condition for the incident light,
    light propagating through the ridge waveguide is in a single mode,
    the ridge waveguide has a periodically domain-inverted structure,
    the domain-inverted structure has two regions with different domain-inverted periods, the regions being provided in series in a direction of propagation of light,
    the incident light comprises plural wavelengths of light,
    first pump light and second pump light further are incident as well as the incident light,
    assuming that a region closer to an incident side of light out of the two regions is a first region and the other region is a second region,
    at the first region, the incident light is converted into difference-frequency light with respect to the first pump light, and
    at the second region, the difference-frequency light converted at the first region is converted into difference-frequency light with respect to the second pump light.

2. The optical waveguide device according to claim 1, wherein the wavelength of the incident light is smaller than a wavelength of the converted light.

3. The optical waveguide device according to claim 1,
    wherein the waveguide layer is made of nonlinear optical crystals, and
    a wavelength of the converted light is twice the wavelength of the incident light.

4. The optical waveguide device according to claim 1,
    wherein the waveguide layer is made of nonlinear optical crystals,
    the incident light comprises plural wavelengths of light,
    pump light as well as the incident light further is incident therein, and
    the converted light is difference-frequency light between the pump light and the incident light.

5. The optical waveguide device according to claim 1, wherein a width of the ridge waveguide is narrower than a width of the slab waveguides.

6. The optical waveguide device according to claim 1, wherein the waveguide layer comprises a thin film made of nonlinear optical crystals.

7. The optical waveguide device according to claim 6, wherein the thin film is bonded to an optical substrate.

8. The optical waveguide device according to claim 6, wherein the thin film is joined directly to an optical substrate.

9. An optical waveguide laser, comprising:
    a light source; and
    the optical waveguide device according to claim 1,
    wherein the waveguide layer of the optical waveguide device comprises a laser medium.

10. The optical waveguide laser according to claim 9, wherein the waveguide layer comprises at least one selected from the group consisting of Er, Nd, Pr and Tu.

11. An optical apparatus comprising the optical waveguide device according to claim 1.

12. An optical waveguide device including a waveguide layer that converts a wavelenth of incident light and emits converted light, the optical waveguide device comprising:
    a ridge waveguide provided in the waveguide layer; and
    slab waveguides formed on both sides of the ridge waveguide with recess portions intervening therebetween,
    wherein the waveguide layer satisfies a multi-mode condition for the incident light,
    light propagating through the ridge waveguide is in a single mode, and
    two or more cladding layers are laminated on the waveguide layer.

13. The optical waveguide device according to claim 12, wherein a cladding layer contacting with the ridge waveguide out of the cladding layers has a refractive index higher than those of other cladding layers.

14. The optical waveguide device according to claim 12, wherein the cladding layer contacting with the ridge waveguide comprises an oxide containing Nb.

15. An optical waveguide device including a waveguide layer that converts a wavelength of incident light and emits converted light, the optical waveguide device comprising:
    a ridge waveguide provided in the wave guide layer; and
    slab waveiguides formed on both sides of the ridge waveguide with recess portions intervening therebetween,
    wherein the waveguide layer satisfies a multiu-mode condition for the incident light,
    light propagating through the ridge waveguide is in a single mode, and
    the waveguide layer has a stepped distribution of refractive index in a depth direction.

* * * * *

UNITED STATES PATENT AND TRADEMARK OFFICE
CERTIFICATE OF CORRECTION

PATENT NO. : 7,171,094 B2
APPLICATION NO. : 10/542424
DATED : January 30, 2007
INVENTOR(S) : Mizuuchi et al.

It is certified that error appears in the above-identified patent and that said Letters Patent is hereby corrected as shown below:

Page 1, second column, line 1 of Other publications: "wavelenght" should read --wavelength--.
Page 2, first column, line 1 of Other Publications: "wavelenght" should read --wavelength--.
Column 16, line 43(claim 15): "wave guide" should read --waveguide--.
Column 16, line 44(claim 15): "waveiguides" should read --waveguides--.
Column 16, line 47(claim 15): "multiu-mode" should read --multi-mode--.

Signed and Sealed this

Twenty-sixth Day of June, 2007

JON W. DUDAS
*Director of the United States Patent and Trademark Office*